United States Patent [19]

Segawa et al.

[11] Patent Number: 4,938,788
[45] Date of Patent: Jul. 3, 1990

[54] METHOD OF PRODUCING UNIFORM SILICA GLASS BLOCK

[75] Inventors: Hideaki Segawa, Yokohama; Koji Tsukuma, Atsugi; Shinichi Kondo, Yokohama; Keishi Honta, Zama, all of Japan

[73] Assignee: Tosoh Corporation, Shinnanyo, Japan

[21] Appl. No.: 291,258

[22] Filed: Dec. 28, 1988

[30] Foreign Application Priority Data

| Dec. 28, 1987 | [JP] | Japan | 62-332939 |
| Dec. 28, 1987 | [JP] | Japan | 62-332940 |
| Mar. 2, 1988 | [JP] | Japan | 63-47576 |
| Mar. 2, 1988 | [JP] | Japan | 63-47577 |
| Jun. 15, 1988 | [JP] | Japan | 63-145791 |
| Jul. 5, 1988 | [JP] | Japan | 63-167042 |
| Jul. 6, 1988 | [JP] | Japan | 63-167935 |
| Jul. 11, 1988 | [JP] | Japan | 63-172196 |
| Dec. 23, 1988 | [JP] | Japan | 63-325605 |

[51] Int. Cl.$^5$ .............................................. C03B 23/20
[52] U.S. Cl. .................................. 65/18.1; 65/1; 65/18.4; 65/900; 264/527
[58] Field of Search ............... 65/18.1, 18.4, 1, 18.2, 65/900; 425/405 H; 264/527

[56] References Cited

U.S. PATENT DOCUMENTS

| 4,388,111 | 7/1982 | Edahiro et al. | 65/900 |
| 4,414,014 | 11/1983 | Bruning et al. | 65/31 |
| 4,441,904 | 4/1984 | Bhatti | 65/1 |
| 4,478,626 | 10/1984 | Moritaki | 425/405 H X |
| 4,515,610 | 5/1985 | Bhatti | 65/1 |

FOREIGN PATENT DOCUMENTS

| 59-116178 | 7/1984 | Japan | 65/18.1 |
| 59-227778 | 12/1984 | Japan | 65/18.1 |

OTHER PUBLICATIONS

Journal of Non-Crystalline Solids, 71, (1985), pp. 287-294, "Hip Glassmaking for High Nitrogen Compositions in the Y-Si-Al-O-N System", Mittl, Tallman, Kelsey and Jolley.

C. R. Acad. SC. Paris, t.285, (10/10/1977), C. pp. 265-268, "Chimie Physique", Michel Decottignies, Jean Phalippou et al.

Journal of Materials Science 13 (1978), pp. 2605-2618, "Synthesis of Glasses by Hot-Pressing of Gels", M. Decottignies, J. Phalippou, J. Zarzycki.

Primary Examiner—Robert L. Lindsay
Attorney, Agent, or Firm—Oblon, Spivak, McClelland, Maier & Neustadt

[57] ABSTRACT

A method of producing a uniform silica glass block comprising using silica powder as a raw material, and treating it at high temperature and pressure by a hot press and/or a hot isostatic press in vacuum or in an inert gas atmosphere, preferably with a capsule of silica glass or a high-melting point metal. By conducting calcination in fluorine, chlorine or their compound gas and then in oxygen, the OH group content of the silica glass can be reduced dramatically.

18 Claims, No Drawings

METHOD OF PRODUCING UNIFORM SILICA GLASS BLOCK

BACKGROUND OF THE INVENTION

The present invention relates to a method of producing a uniform silica glass block, and more particularly to a method of producing a uniform silica glass block having no voids and cords, and also having transmittance of light beam ranging from infrared to ultraviolet equal to or better than that of presently available optical synthetic silica glass. Further, it relates to a method of producing a uniform silica glass excellent not only in the above properties but also in heat resistance.

Silica glass blocks, particularly anhydrous silica glass blocks, are presently produced by the following methods:

(1) Melting method using natural rock crystals as raw materials;

(2) Bernoulli method using $SiCl_4$ as a raw material and converting it to $SiO_2$ by an oxygen plasma flame; and (3) VAD method (soot method) using $SiCl_4$ as a raw material and converting it to a porous body (preform) of $SiO_2$ with an oxyhydrogen flame and sintering it to provide a silica glass block.

However, the silica glass produced by the above methods has various problems. Specifically, in the case of the method (1), the resulting silica glass has nonuniform portions such as voids, cords, etc., and since natural rock crystals are used, the silica glass does not have sufficiently high purity. In the case of the method (2), nonuniform portions such as voids and cords are likely to be generated, and chlorine tends to remain in the resulting glass block in an amount of 200 ppm or so. Further, in the case of the method (3), it is difficult to provide a large silica glass block.

In general, once voids or cords are introduced into the glass, it is extremely difficult to remove them, so that the resulting glass cannot be used as optical silica glass which is required to have extremely high uniformness.

In view of the above problems, the inventors previously filed a patent application for a method of removing voids and cords from silica glass by a high-temperature, high-pressure treatment (Japanese Patent Application No. 62-24702). In this method, the voids and cords generated in the silica glass in its production step are removed by a subsequent high-temperature, high-pressure treatment. However, this treatment does not sufficiently remove the voids and the cords, and this treatment undesirably increases the production costs of silica glass blocks. Therefore, it has been desired to find out conditions under which any voids or cords are prevented from being generated in silica glass blocks, from the viewpoint of production costs.

In general, to achieve high uniformness, it is desired to melt glass to a low viscosity. In this respect, since usual optical glass, which is made of a plurality of components, has a lower softening temperature than the silica glass, it can have a viscosity of $10^5$ poise or less by heating. Thus, by stirring at such a viscosity, high uniformness can be achieved.

However, since the silica glass has a high softening temperature, it has a high viscosity even when heated up to 2000° C., making it difficult to make it uniform by stirring. Further, even if it is tried to reduce its viscosity at which its stirring is possible, by heating it to as high a temperature as 2000° C. or more, it would practically be difficult to find refractory materials usable at such a high temperature. In addition, at such a high temperature, silica is extremely vaporized under normal pressure, causing the problem of extreme material losses. Accordingly, the heating of the silica glass to an extremely high temperature is not a practical method as a means of providing uniform silica glass.

In view of the above, to obtain optically uniform silica glass, large ingots are presently produced and proper sizes of glass blocks are cut out from them, and uniform portions are selected from the cut portions, and ground and polished to final shapes.

However, for the purpose of obtaining high purity, uniform silica glass block, the above method is disadvantageous in that the yield of final products is extremely low, making the production costs extremely high. In addition, this method fails to provide silica glass blocks of arbitrarily desired shapes without additional working.

OBJECT AND SUMMARY OF THE INVENTION

An object of the present invention is, therefore, to provide a method of producing a uniform silica glass block free from the above problems.

Another object of the present invention is to provide a method of producing a silica glass block which is uniform and has high transparency and extremely small voids, if any.

A further object of the present invention is to provide a method of producing a silica glass block having not only the above properties but also good heat resistance because of small percentage of hydroxide groups.

A still further object of the present invention is to provide a method of producing a silica glass block of an arbitrarily desired shape having the above properties.

As a result of intense research in view of the above objects, the inventors have found that by using silica powder as a raw material, and by subjecting it to a high-temperature, high-pressure treatment such as hot pressing and/or hot isostatic pressing in an inert gas atmosphere, in a state of being sealed in a capsule, if necessary, a uniform silica glass block can be produced with high yield. The present invention is based upon this finding.

Thus, the method of producing a uniform silica glass block according to the present invention comprises using silica powder as a raw material, and subjecting it to a high-temperature, high-pressure treatment to melt and solidify it uniformly.

In the present invention, the high-temperature, high-pressure treatment is hot isostatic pressing and/or hot pressing, and in any case the silica powder is desirably sealed in a gas-tight container which can prevent an atmosphere gas or a pressure medium gas from penetrating thereinto, in the step of the high-temperature, high-pressure treatment. Incidentally, in the case of hot pressing, the container charged with silica powder is desirably embedded in such powder as silica powder or carbon powder.

The hot pressing or the hot isostatic pressing can be carried out alone, but by carrying them out in combination, a silica glass block with further improved uniformness can be obtained.

Further, a uniform silica glass block containing no OH groups can be produced efficiently by conducting calcination of the silica powder or its green body in an atmosphere of fluorine, chlorine or their compound gas, in an oxygen gas atmosphere and then in a helium gas atmosphere each at a temperature of 800° C. or more for 10 minutes or more, and then by subjecting it to a high-temperature, high-pressure treatment.

DETAILED DESCRIPTION OF THE INVENTION

Silica powder usable as a raw material is not restricted to a particular one, and any silica powder, for instance, silica powder produced from silica gel obtained by a wet method, silica powder produced by a vapor phase method, etc. can be used. The silica powder may be amorphous or crystalline. Its average particle size is not restricted to a particular range, but from the viewpoint of reactivity and easiness of handling, it is preferably 0.1–500 μm, and more preferably 5–250 μm, particularly 1–50 μm. Incidentally, when anhydrous silica glass containing 1 ppm or less of OH groups is to be produced, the silica powder is desirably very fine, particularly as fine as 1–10 μm. With respect to the purity of raw material powder, it is preferably 99.8% or more from the viewpoint of uniformness and transparency of the resulting glass, and a more preferred purity is 99.9% or more, and particularly 99.95% or more.

To produce a uniform silica glass block from the silica powder, a high-temperature, high-pressure treatment is conducted. This high-temperature, high-pressure treatment is preferably hot pressing and/or hot isostatic pressing.

In the case of hot pressing, it may be conducted in vacuum (reduced pressure) or in an inert gas atmosphere without charging the silica powder in a gas-tight container. In the case of vacuum or reduced pressure, the pressure is 1 Pa or less, and in the case of the inert gas atmosphere, Ar, He, etc. may be used, and He is particularly preferable. When He is used as an atmosphere gas, the container does not have to be gas-tight. The hot pressing conditions are a temperature of 1100° C. or more, preferably 1200–2000° C., and pressure of 5 MPa or more, preferably 10–100 MPa. The hot pressing time is generally 5–8 hours or so in the total process from temperature elevation to cooling.

However, to avoid the influence of an atmosphere gas as much as possible, the silica powder is desirably sealed in a gas-tight container before the high-temperature, high-pressure treatment.

As a container for filling the silica powder, a silica glass capsule or a high-melting point capsule is preferable. In the case of a silica glass capsule, its thickness is preferably 0.3–3 mm, and more preferably 0.5–1.5 mm. When its thickness is less than 0.3 mm, the capsule is easily broken, necessitating more careful attention in handling it, and in the case of hot isostatic pressing (HIP) as a means for obtaining high temperature and pressure, a pressure medium gas penetrates through it, thereby being dissolved and diffused in the silica glass contained therein, deteriorating the uniformness of the resulting silica glass block. On the other hand, even though a silica glass capsule having a thickness exceeding 3 mm is used, further advantages cannot be obtained. In the case of the high-melting point metal capsule, it may be made of molybdenum, tantalum, tungsten, etc. The thickness of the high-melting point metal is preferably 0.05–5 mm, and more preferably 0.1–0.5 mm. When its thickness is less than 0.05 mm, the capsule is likely to be broken in the process of high-temperature, high-pressure treatment, and when it exceeds 5 mm, significant increase in its effects cannot be obtained. In addition, by providing the capsule with a desired shape, a silica block having a desired shape can be obtained easily.

The silica powder is charged into the capsule in a density of 1.1 g/cm$^3$ or more, and more preferably 1.5 g/cm$^3$. When the density of the silica powder charged into the capsule is less than 1.1 g/cm$^3$, the resulting silica glass block tends to have large numbers of voids. Particularly when the capsule is made of silica glass, it is easily broken.

The capsule containing the silica powder is sealed preferably after evacuating to 1 Pa or less at room temperature or at several hundred °C., filling it with a helium gas several times and then evacuating again to 1 Pa or less. Incidentally, in the case of the silica glass capsule, the sealing of the capsule can be conducted by fusing its vent opening. And in the case of the high-melting point metals, the sealing is conducted by electron beam welding.

The silica powder sealed in the container is subjected to a high-temperature, high-pressure treatment as described below.

(1) Hot pressing (HP)

The capsule is embedded in powder unreactive to the capsule, such as carbon powder, boron nitride, etc. or in silica powder in a hot press mold, and the mold is placed in a hot press apparatus. The hot pressing temperature is 1100° C. or more, preferably 1200°–2000° C., and the pressure is 5 MPa or more, and preferably 10–100 MPa. In the case of using crystalline silica powder as powder surrounding the capsule, the hot pressing temperature is preferably 1200°–1650° C. Hot pressing atmosphere may be under a vacuum of 1 Pa or less or an inert gas such as Ar, He, etc.

By charging powder around the capsule in a mold, a pseudo-HIP condition can be achieved, preventing the capsule from being deformed, and making it easier to apply uniform pressure to any shapes of capsules. With respect to an average particle size of the powder charged in a mold, it is 5–500 μm for carbon powder, and 5–250 μm for silica powder.

When a silica glass capsule is used as a gas-tight container, it is necessary to increase the temperature to 1100° C., preferably 1200° C. or more, and then start increasing the pressure to prevent the cracking of the capsule.

The treatment by HP is generally 5–12 hours in the total process from temperature increase to cooling.

(2) Hot isostatic pressing (HIP)

In this case, the capsule containing silica powder may be placed in an HIP apparatus without surrounding the capsule with powder, but, if necessary, powder unreactive to the capsule, such as carbon powder, boron nitride powder, etc. may be used to surround the capsule in the HIP apparatus. The HIP temperature is 1100° C. or more, preferably 1200°–2000° C., and the pressure is 5 MPa or more, preferably 10–200 MPa. The pressure medium gas is an inert gas such as Ar.

The use of the surrounding powder can prevent the deformation of the capsule called "sagging," which takes place in a high temperature treatment of 1600° C. or more. With respect to an average particle size of the powder charged around the capsule, it is preferably the same as described above.

Incidentally, in the case of using the silica glass capsule as a container, it is necessary to elevate the temperature to 1100° C., preferably 1200° C. or more and then start increasing the pressure to prevent the cracking of the capsule.

HIP treatment time is generally 5-12 hours in the total process from temperature elevation to cooling.

In addition to conducting HP and HIP alone, they may be used in combination. In the case of HP/HIP treatment, the hot pressing is conducted at 1100° C., preferably at 1200°-2000° C. and at 5 MPa or more, preferably at 10-100 MPa, and then the resulting silica glass block is placed in a HIP apparatus and subjected to a HIP treatment at 1200° C. or more, preferably at 1400°-2000° C. and at 1 MPa or more, preferably at 10-200 MPa. Unless the temperature and pressure conditions are met in the HP process and the HIP process, the desired optical properties cannot be achieved.

The capsule used in the HP process needs not be removed in the subsequent HIP treatment, but in some cases, HIP can be conducted after removing it. However, for the purpose of preventing a pressure medium gas from being diffused into the silica glass block, the HIP treatment is desirably conducted without removing the capsule.

The HP time and the HIP time are respectively 5-8 hours or so, including temperature elevation and cooling steps.

By conducting HP and HIP under the above conditions, more uniform and denser silica glass blocks can be obtained than when either one of the above treatments is conducted.

In the present invention, to improve the heat resistance of the silica glass block, it is necessary to reduce the content of OH groups. For this purpose, the silica powder or its green body is subjected to a treatment for removing OH groups successively in (a) an atmosphere of fluorine, chlorine or their compound gas, (b) an oxygen gas atmosphere, and then (c) a helium gas atmosphere each at a temperature of 800° C. or more for 10 minutes or more, and then subjected to a high-temperature, high-pressure treatment of HP and/or HIP.

In the treatment for removing OH groups, the silica powder or its green body is treated successively in (a) an atmosphere of fluorine, chlorine or their compound gas, (b) an oxygen gas atmosphere, and then (c) a helium gas atmosphere each at a temperature of 800° C. or more for 10 minutes or more. The green body can be produced by die-pressing, cold isostatic pressing (CIP), etc.

As the atmosphere (a). a fluorine gas, a chlorine gas, or a fluorine and/or chlorine compound gas such as $BF_3$, $B_2F_6$, $BrF$, $BrF_3$, $BrF_5$, $NF_3$, $NOF$, $NO_2F$, $PF_3$, $PF_5$, $POF_3$, $SiF_4$, $Si_2F_6$, $PSF_3$, $SF_4$, $SF_6$, $SOF_2$, $SO_2F_2$, $BCl_3$, etc. can be used. The exposure of the silica powder or its green body to these gases at 800° C. or more for 10 minutes or more serves to convert the OH groups in the silica to fluorine or chlorine. Next, it is similarly treated at 800° C. or more for 10 minutes or more in the oxygen gas atmosphere (b). As a result, the chlorine or fluorine in the silica is converted to oxygen. Finally, it is heated under the same conditions in the helium gas atmosphere (c) to complete the removal of OH groups. When a green body is used, this treatment acts as calcination at the same time. The calcinated product has a density of 90% (about 2 g/cm$^3$) or more, preferably 95% (about 2.1 g/cm$^3$) or more.

Next, the silica powder or green body thus treated is charged into a high-melting point capsule in a density of 1.1 g/cm$^3$ or more, preferably 1.5 g/cm$^3$ or more. In this case, the capsule should have such gas tightness that it permits the flow of gas but prevents the surrounding powder from penetrating into the capsule. The capsule containing the silica powder is placed in a HP apparatus and subjected to a high-temperature, high-pressure treatment at 1100° C. or more, preferably at 1200°-2000° C., particularly 1400°-1700° C. and at 5 MPa or more, preferably at 10-200 MPa in an atmosphere of an inert gas, preferably a helium gas.

Incidentally, in the case of conducting a high-temperature, high-pressure treatment by HIP, the silica glass product thus treated is sealed in a silica glass capsule or a high-melting point capsule to prevent the pressure medium gas from being melted and diffused in the resulting silica glass.

The silica glass thus produced are uniform, anhydrous silica glass having an OH group concentration of 1 ppm or less, and free from voids and cords.

By the method described above, a uniform silica glass block free from voids can be obtained. In the silica glass block obtained by the method of the present invention, voids are generally 10 μm or less. Particularly when subjected to a HP treatment in helium, voids are 1 μm or less. Further, in the case of HP/HIP treatment, substantially no voids are generated in the resulting silica glass block. The uniformness of the resulting silica glass block is $2 \times 10^{-6}$ or less when expressed by the variation of refractive index ($\Delta n$). With respect to transparency, the silica glass block is substantially on the same level as synthetic silica glass in the range from infrared to visible to ultraviolet.

In the method of the present invention, since silica powder as a raw material is subjected to a high-temperature, high-pressure treatment, such as HP and/or HIP, in vacuum of 1 Pa or less or in an inert gas atmosphere such as He, and, if necessary, while being sealed in a gas-tight capsule, the resulting silica glass block is extremely uniform, free from voids and cords.

Further, by conducting the high-temperature, high-pressure treatment after treating silica powder or its green body in an atmosphere of fluorine, chlorine or their compound gas, in an oxygen gas atmosphere and then in a helium gas atmosphere, heat-resistant, high-uniformness silica glass having extremely small OH content can be obtained.

The reason why such a uniform silica glass block is obtained by the method of the present invention is considered to be that the silica powder used as a raw material is uniform and subjected to a high-temperature, high-pressure treatment in a state isolated from an atmospheric gas or a pressure medium gas.

The present invention will be explained in further detail by means of the following Examples, without intending to restrict the scope of the present invention.

EXAMPLE 1

1000 g of amorphous silica powder having an average particle size of 70 μm and a purity of 99.99% was charged into a cylindrical silica glass capsule of 120 mm in diameter, 80 mm in height and 3 mm in thickness, heated at about 400° C. while being evacuated to 1 Pa or less. After filling the capsule with a helium gas 3 times, it was evacuated again to 1 Pa or less, and then sealed.

This sample was placed in a hot isostatic press (HIP), and the temperature was increased to 1400° C. under pressure of 1 MPa or less. After reaching 1400° C., it was kept at that temperature for 30 minutes, and its temperature and pressure were elevated. Finally, the temperature reached 1800° C. and the pressure reached 100 MPa, and the hot isostatic pressing was conducted under these conditions for 2 hours.

After completion of the treatment, the sample was removed from the HIP apparatus, and the surface of the sample was machined in a thickness of about 5–10 mm to remove a surface layer in which an argon gas was dissolved. As a result, a uniform silica glass block of 90 mm in diameter and 60 mm in thickness was obtained.

The resulting silica glass block contained no voids of 1 μm or more, and had transparency substantially on the same level as that of optical synthetic silica glass. To evaluate its uniformness, its distribution of refractive index was measured by a laser interference spectroscope (ZYGO Mark II). As a result, it was found that the variation of refractive index ($\Delta n$) from place to place in the silica glass block was $2 \times 10^{-6}$ or less.

EXAMPLE 2

1000 g of amorphous silica powder having an average particle size of 70 μm and a purity of 99.99% was charged into a cylindrical silica glass capsule of 100 mm in diameter, 100 mm in height and 3 mm in thickness, heated at about 200° C. while being evacuated to $10^{-1}$ Pa or less. After filling the capsule with a helium gas 3 times, it was evacuated again to $10^{-1}$ Pa or less and then sealed.

This sample was placed in a hot isostatic press (HIP), and the temperature was increased to 1400° C. under pressure of 1 MPa or less. After reaching 1400° C., it was kept at that temperature for 30 minutes, and its temperature and pressure were elevated. Finally, the temperature reached 1800° C. and the pressure reached 100 MPa, and the hot isostatic pressing was conducted under these conditions for 2 hours. After completion of the treatment, the sample was removed from the HIP apparatus, and the surface of the sample was machined in a thickness of about 5–10 mm to remove a surface layer in which an argon gas was dissolved. As a result, a uniform silica glass block of 70 mm in diameter and 60 mm in height was obtained.

The resulting silica glass block contained no voids of 1 μm or more, and had transparency substantially on the same level as that of synthetic silica glass. To evaluate its uniformness, its distribution of refractive index ($\Delta n$) was measured as in Example 1. As a result, it was found that the variation of refractive index ($\Delta n$) from place to place in the silica glass block was $2 \times 10^{-6}$ or less.

EXAMPLE 3

180 g of amorphous silica powder having an average particle size of 70 μm and a purity of 99.99% was charged into a cylindrical molybdenum capsule of 60 mm in diameter, 50 mm in height and 0.5 mm in thickness, heated at about 200° C. while being evacuated to $10^{-2}$ Pa or less. After filling the capsule with a helium gas 3 times, it was evacuated again to $10^{-2}$ Pa or less, and then sealed by an electron beam welder.

This sample was subjected to a hot isostatic pressing treatment at a temperature of 1700° C. and pressure of 100 MPa for 1 hour. After the HIP treatment, the sample was removed from the HIP apparatus, and the molybdenum capsule was dissolved away by nitric acid.

The resulting silica glass block contained no voids of 1 μm or more, and had transparency substantially on the same level as that of optical synthetic silica glass. Its distribution of refractive index was measured as in Example 1. As a result, the variation of refractive index ($\Delta n$) from place to place in the silica glass block was $2 \times 10^{-6}$ or less.

EXAMPLE 4

100 g of amorphous silica powder having an average particle size of 70 μm and a purity of 99.9% was charged into a cylindrical molybdenum can of 40 mm in diameter, 60 mm in height and 0.5 mm in thickness, heated at about 200° C. while being evacuated to $10^{-1}$ Pa or less. After filling the capsule with a helium gas 3 times, it was evacuated again to $10^{-3}$ Pa or less, and then sealed by an electron beam welder.

This sample was subjected to a hot isostatic pressing treatment at a temperature of 1800° C. and pressure of 100 MPa for 1 hour. After the HIP treatment, the sample was removed from the HIP apparatus, and the molybdenum can was dissolved away by nitric acid.

The resulting silica glass block contained no voids of 1 μm or more, and had transparency substantially on the same level as that of optical synthetic silica glass. To evaluate its uniformness, its distribution of refractive index was measured as in Example 1. As a result, the variation of refractive index ($\Delta n$) from place to place in the silica glass block was $2 \times 10^{-6}$ or less.

EXAMPLE 5

130 g of crystalline silica powder having an average particle size of 70 μm and a purity of 99.9% was charged into a cylindrical molybdenum capsule of 50 mm in diameter, 50 mm in height and 0.5 mm in thickness, heated at about 200° C. while being evacuated to $10^{-2}$ less. After filling the capsule with a helium gas 3 times, it was evacuated again to $10^{-2}$ Pa or less, and then sealed by an electron beam welder.

This sample was subjected to a hot isostatic pressing treatment at a temperature of 1800° C. and pressure of 100 MPa for 1 hour. After the HIP treatment, the sample was removed from the HIP apparatus, and the molybdenum capsule was dissolved away by nitric acid. The resulting silica glass block had substantially the same shape as the molybdenum capsule, meaning that the shape of the molybdenum can was substantially transferred to the final product.

The silica glass block contained no voids of 1 μm or more, and had transparency substantially on the same level as that of optical synthetic silica glass. The variation of refractive index ($\Delta n$) from place to place in the resulting silica glass block was $2 \times 10^{-6}$ or less.

EXAMPLE 6

1000 g of crystalline silica powder having an average particle size of 70 μm and a purity of 99.9% was charged into a cylindrical silica glass capsule of 100 mm in diameter, 100 mm in height and 3 mm in thickness, heated at about 200° C. while being evacuated to $10^{-1}$ Pa or less. After filling the capsule with a helium gas 3 times, it was evacuated again to $10^{-1}$ Pa or less and then sealed.

This sample was placed in a hot isostatic press (HIP), and the temperature was increased to 1400° C. under pressure of 1 MPa or less. After reaching 1400° C., it was kept at that temperature for 30 minutes, and its temperature and pressure were elevated. Finally, the temperature reached 1800° C. and the pressure reached 100 MPa, and the hot isostatic pressing was conducted under these conditions for 2 hours. After completion of the treatment, the sample was removed from the HIP apparatus, and the surface of the sample was machined in a thickness of about 5-10 mm to remove a surface layer in which an argon gas was dissolved. As a result, a uniform glass block of 70 mm in diameter and 70 mm in height was obtained.

The resulting silica glass block contained no voids of 1 μm or more, and had transparency substantially on the same level as that of synthetic silica glass. As a result of measurement as in Example 1, it was found that the variation of refractive index ($\Delta n$) from place to place in the silica glass block was $2 \times 10^{-6}$ or less.

EXAMPLE 7

45 g of crystalline silica powder having an average particle size of 70 μm and a purity of 99.9% was charged into a cylindrical molybdenum can of 30 mm in diameter, 5 mm in height and 0.5 mm in thickness, heated at about 200° C. while being evacuated to $10^{-1}$ Pa or less. After filling the capsule with a helium gas, it was evacuated again to $10^{-3}$ Pa or less, and then sealed by an electron beam welder.

This sample was subjected to a hot isostatic pressing (HIP) treatment at a temperature of 1750° C. and pressure of 100 MPa for 1 hour. After the HIP treatment, the sample was removed from the HIP apparatus, and the molybdenum can was removed.

The resulting silica glass block contained no voids of 1 μm or more, and had transmittance substantially on the same level as that of optical synthetic silica glass. To evaluate its uniformness, its distribution of refractive index was measured as in Example 1. As a result, the variation of refractive index ($\Delta n$) from place to place in the silica glass block was $2 \times 10^{-6}$ or less.

EXAMPLE 8

180 g of crystalline silica powder having an average particle size of 70 μm and a purity of 99.9% was charged into a cylindrical molybdenum capsule of 80 mm in diameter, 50 mm in height and 0.5 mm in thickness, heated at about 200° C. while being evacuated to $10^{-2}$ Pa or less. After filling the capsule with a helium gas 3 times, it was evacuated again to $10^{-2}$ Pa or less, and then sealed by an electron beam welder.

This sample was placed in a hot press mold with carbon powder charged between the capsule and the mold, and subjected to a hot pressing treatment at a temperature of 1800° C. and pressure of 20 MPa for 1 hour in the mold. After the HP treatment, the sample was removed from the HP apparatus, and the molybdenum capsule was dissolved away by nitric acid.

The resulting silica glass block contained no voids of 1 μm or more, and had transmittance substantially on the same level as that of the presently available optical synthetic silica glass. To evaluate its uniformness, its distribution of refractive index was measured as in Example 1. As a result, the variation of refractive index ($\Delta n$) from place to place in the resulting silica glass block was $2 \times 10^{-6}$ or less.

EXAMPLE 9

1000 g of amorphous silica powder having an average particle size of 70 μm and a purity of 99.8% or more was charged into a cylindrical molybdenum can of 100 mm in diameter, 100 mm in height and 0.5 mm in thickness. This sample was placed in a hot press (HP) charged with carbon powder and was subjected to a HP treatment at a temperature of 1800° C. and pressure of 20 MPa for 2 hours in an atmosphere having pressure of $10^{-1}$ Pa. After the HP treatment, the sample was removed from the HP apparatus, and the molybdenum can was removed, thereby providing a uniform silica glass block.

To evaluate the uniformness of the resulting silica glass block obtained in this Example, the distribution of the refractive index was measured as in Example 1. As a result, the variation of the refractive index ($\Delta n$) from place to place in the resulting silica glass block was $2 \times 10^{-6}$ or less. In addition, the silica glass block did not contain any voids of 1 μm or larger and had transmittance substantially on the same level as conventional optical synthetic silica glass.

EXAMPLE 10

500 g of amorphous silica powder having an average particle size of 5 μm and a purity of 99.9% was subjected to cold isostatic pressing (CIP) at 200 MPa, and the resulting green body was subjected to hot press treatment at a temperature of 1250° C. and a pressure of 10 MPa in an argon gas atmosphere for 1 hour. After the HP treatment, the sample was removed from the apparatus and a surface layer in which an argon gas was dissolved was removed, thereby providing a uniform silica glass block.

To evaluate the uniformness of the resulting silica glass block obtained in this Example, the distribution of the refractive index was measured as in Example 1. The variation of the refractive index ($\Delta n$) from place to place in the resulting silica glass block was $2 \times 10^{-6}$. In addition, the silica glass block did not contain any voids of 10 μm or larger and had transmittance substantially on the same level as conventional optical silica glass.

EXAMPLE 11

500 g of amorphous silica powder having an average particle size of 15 μm and a purity of 99.9% or more was charged into a cylindrical molybdenum capsule of 100 mm in outer diameter, 50 mm in height and 0.5 mm in thickness, in a density of 1.2 g/cm$^3$, and it was embedded in carbon powder having a particle size of 0.15 mm in a mold.

This sample was subjected to a hot pressing treatment at a temperature of 1700° C. and pressure of 10 MPa for 2 hours. After the HP treatment, the sample was removed from the HP apparatus, and the molybdenum capsule was dissolved away by nitric acid.

The resulting silica glass block contained no voids of 1 μm or more, and had transmittance substantially on the same level as that of optical synthetic silica glass. Further, its variation of refractive index ($\Delta n$) measured in the same manner as in Example 1 was $2 \times 10^{-6}$ or less. In addition, the silica glass block had substantially the same shape as the molybdenum capsule, meaning that the molybdenum capsule's shape was substantially transferred to the final product.

EXAMPLE 12

500 g of amorphous silica powder having an average particle size of 15 μm and a purity of 99.9% or more was charged into a cylindrical molybdenum capsule of 100 mm in outer diameter, 50 mm in height and 0.5 mm in thickness in a density of 1.2 g/cm$^3$, and it was embedded in silica powder of 0.15 mm in particle size contained in a HP mold.

This sample was subjected to a hot pressing (HP) treatment at a temperature of 1650° C. and pressure of 20 MPa in a helium gas atmosphere for 2 hours. After the HP treatment, the sample was removed from the HP apparatus, and the molybdenum capsule was dissolved away by nitric acid to obtain a silica glass block.

The resulting silica glass block contained no voids of 10 μm or more, and had transmittance substantially on the same level as that of optical synthetic silica glass. To evaluate the uniformness of the silica glass block, its distribution of refractive index was measured in the same manner as in Example 1. As a result, the variation of refractive index (Δn) from place to place in the silica glass block was $2.0 \times 10^{-6}$. Further, the silica glass block had substantially the same shape as the molybdenum capsule, meaning that the molybdenum capsule's shape was substantially transferred to the final product.

EXAMPLE 13

50 g of amorphous silica powder having an average particle size of 70 μm and a purity of 99.9% was subjected to a cold isostatic pressing (CIP) treatment at pressure of 200 MPa to produce a cylindrical green body having a diameter of 40 mm and a height of 30 mm. This green body was then charged into a molybdenum can having an inner diameter of 40 mm and a height of 30 mm and charged into a mold for hot pressing containing crystalline silica powder having a particle size of 0.1-0.8 mm. It was then placed in a HP apparatus. After evacuating to a pressure of 1 Pa or less, it was filled with a helium gas. It was then subjected to a hot pressing (HP) treatment at a temperature of 1650° C. and pressure of 20 MPa for 1 hour. After the HP treatment, the sample was removed, and a molybdenum layer was removed by dissolving it away by a nitric acid.

The resulting silica glass block contained no voids of 10 μm or more, and had transmittance substantially on the same level as that of synthetic silica glass. To evaluate its uniformness, its distribution of refractive index (Δn) was measured as in Example 1. As a result, the variation of refractive index (Δn) from place to place in the resulting silica glass block was $2 \times 10^{-6}$.

EXAMPLE 14

1000 g of amorphous silica powder having an average particle size of 15 μm and a purity of 99.9% or more was subjected to cold isostatic pressing at a pressure of 200 MPa to produce a green body. After charging the green body into a molybdenum capsule, it was embedded in carbon powder contained in a HP mold. This sample was then subjected to a hot pressing (HP) treatment at a temperature of 1700° C. and pressure of 10 MPa for 2 hours in a helium gas atmosphere.

After the HP treatment, the sample was removed from the HP apparatus, and the molybdenum capsule was dissolved away by nitric acid. Next, it was subjected to a hot isostatic pressing (HIP) treatment at a temperature of 1800° C. and pressure of 100 MPa for 1 hour, using an argon gas as a pressure medium. After the HIP treatment, the sample was removed, and the surface layer in which an argon gas was dissolved was removed to provide a silica glass block. (Sample No. 1).

The silica glass block (Sample No. 1) was measured with respect to voids and the distribution of refractive index (Δn). The results are shown together with heat treatment conditions in Table 1.

For comparison, a silica glass block was produced in the same manner as above except for conducting no hot isostatic pressing treatment. The resulting silica glass block (Sample No. 2) was measured with respect to voids and the distribution of refractive index (Δn). The results are shown in Table 1.

Further, a silica glass block was produced in the same manner as in Sample No. 2 except for conducting the hot pressing treatment in an argon gas atmosphere. The resulting silica glass block (Sample No. 3) was measured with respect to voids and the distribution of refractive index (Δn). The results are shown in Table 1.

TABLE 1

| Heat Treatment Conditions | Sample No. 1 | Sample No. 2 | Sample No. 3 |
| --- | --- | --- | --- |
| Type of Heat Treatment (1) | HP/HIP | HP | HP |
| Temperature (°C.) | 1700/1800 | 1700 | 1700 |
| Pressure (MPa) | 10/100 | 10 | 10 |
| Atmosphere and Pressure Medium Properties | He/Ar | He | Ar |
| Voids (2) | No | 1 μm or less | 10 μm or less |
| Variation of Refractive Index (Δn) (× $10^{-6}$) | 1.80 | 1.87 | 2.00 |

Note (1):
HP: Hot pressing
HIP: Hot isostatic pressing
Note (2):
No: containing no voids
1 μm or less: containing several numbers of voids of 1 μm or less.
10 μm or less: containing voids up to 10 μm.

EXAMPLE 15

800 g of amorphous silica powder having an average particle size of 70 μm and a purity of 99.9% was formed into a green body of 120 mm in diameter and 50 mm in height by a cold isostatic pressing at a pressure of 200 MPa. It was then heated to 1000° C. at a heating rate of 200° C./h in a furnace in a helium gas atmosphere. After evacuating it to a pressure of 10 Pa or less, it was filled with a chlorine gas. while flowing the chlorine gas at a rate of 0.3 l/min, it was kept at a temperature of 1000° C. for 1 hour. Next, after evacuating it to 10 Pa or less, it was filled with an oxygen gas. While flowing the oxygen gas at a rate of 0.3 l/min, it was kept at a temperature of 1000° C. for 30 minutes. Further, it was filled with a helium gas, and while flowing the helium gas at a rate of 0.3 l/min, it was heated to 1200° C. at a rate of 200° C./h, kept at 1200° C. for 2 hours, and then cooled in the furnace. The sample thus calcinated was embedded in carbon powder, and a hot pressing treatment was conducted at a temperature of 1700° C. and pressure of 10 MPa in a helium gas atmosphere.

After the treatment, the sample was removed from the HP apparatus, and a surface portion of the sample was removed in a thickness of about 2-3 mm. As a result, a uniform, anhydrous silica glass block of 95 mm in diameter and 40 mm in height (Sample No. 4) was obtained.

To evaluate its uniformness, its distribution of refractive index was measured in the same manner as in Example 1. As a result, it was found that the variation of refractive index (Δn) from place to place in the silica glass block was $2 \times 10^{-6}$ or less. In addition, an infrared absorption was measured on a sample having a thickness of 10 mm taken from the silica glass block. As a result, any absorption peak indicating OH groups was not observed. This means that the OH group content is 1 ppm or less.

For comparison, the concentration of OH groups was also measured on a sample produced in the same manner except for conducting no calcination (OH group removing treatment) (Sample No. 5). The result is shown in Table 2.

TABLE 2

| Sample No. | Hydroxide Group Concentration (ppm) |
|---|---|
| 4 | <1 |
| 5 | 300–800 |

It is thus clear that the OH group content in the silica glass is extremely reduced by calcination (OH group removing treatment) in the above gases. With respect to uniformness, Sample Nos. 4 and 5 were substantially the same.

EXAMPLE 16

1000 g of amorphous silica powder having an average particle size of 50 μm and a purity of 99.99% was formed into a green body of 120 mm in diameter and 50 mm in height by a cold isostatic press at a pressure of 200 MPa. It was then heated to 1000° C. at a heating rate of 200° C./h in a helium gas atmosphere in a furnace. After evacuated to 10 Pa or less, the atmosphere was changed to a chlorine gas, and the green body was kept at a temperature of 1000° C. for 1 hour. Next, after evacuated to 10 Pa or less, the atmosphere was changed to an oxygen gas, and the temperature was increased to 1200° C. When the temperature reached 1200° C., the atmosphere was changed to a helium gas, and the green body was kept at 1200° C. for 2 hours. It was then cooled in the furnace to obtain a calcinated body.

Next, the sample thus calcinated was embedded in a carbon powder, and a hot pressing (HP) treatment was conducted thereon at a temperature of 1700° C. and pressure of 10 MPa in a helium gas atmosphere for 2 hours. After the HP treatment, the sample was removed from the HP apparatus, and its surface portion was removed in a thickness of 2–3 mm. As a result, a uniform, anhydrous silica glass block of 95 mm in diameter and 40 mm in height (Sample No. 6) was obtained.

The resulting silica glass block (Sample No. 6) contained no nonuniformness such as voids, cords, etc. Table 3 shows the concentration of hydroxide groups for Sample No. 6 obtained by a high-temperature, high-pressure treatment after calcination, and also for Sample No. 7 produced by the same high-temperature, high-pressure treatment except for conducting no OH group removal treatment.

TABLE 3

| Sample No. | Hydroxide Group Concentration (ppm) |
|---|---|
| 6 | <1 |
| 7 | 300–800 |

It is thus clear that the OH group content in the silica glass is extremely reduced by calcination (OH group removing treatment) in the above gases. With respect to uniformness, Sample Nos. 6 and 7 were substantially the same.

As described above, according to the present invention, a uniform silica glass block can be obtained, since silica powder as a raw material is subjected to a high-temperature, high-pressure treatment such as hot pressing and/or hot isostatic pressing in vacuum or in an inert gas atmosphere, while being sealed in a gas-tight container, if necessary.

Further, by conducting the calcination of silica powder or its green body in an atmosphere of fluorine, chlorine or their compound gas and then in an oxygen gas atmosphere before the high-temperature, high-pressure treatment, a uniform silica glass blocks with good heat resistance because of no OH groups can be obtained.

In the present invention, by surrounding a gas-tight capsule containing silica powder with carbon powder or silica powder in the step of the high-temperature, high-pressure treatment, the silica glass block can have substantially the same shape as that of the capsule With respect to transparency, the silica glass block of the present invention is substantially on the same level as conventional synthetic silica glass in the range from infrared to visible to ultraviolet.

The present invention has been explained by Examples, but it should be noted that it is not restricted thereto, and that any modifications are possible unless they deviate from the scope of the present invention defined in the claims attached hereto.

What is claimed is:

1. A method of producing a uniform silica glass block comprising, calcining silica powder or its green body in an atmosphere of a fluorine gas, a chlorine gas or their compound gas, then in an oxygen gas atmosphere and then in a helium gas atmosphere each at a temperature of 800° C. or more for 10 minutes or more, and then subjecting the calcined product to a high-temperature, high-pressure treatment to provide a uniform, anhydrous silica glass block having an OH group concentration of 1 ppm or less.

2. The method of producing a uniform silica glass block according to claim 1, wherein said silica powder is amorphous silica powder, and it is subjected to a high-temperature, high-pressure treatment at a temperature of 1100° C. or more and pressure of 5 MPa or more.

3. The method of producing a uniform silica glass block according to claim 1, wherein said silica powder is crystalline silica powder, and it is subjected to a high-temperature, high-pressure treatment at a temperature of 1500° C. or more and pressure of 5 MPa or more.

4. The method of producing a uniform silica glass block according to claim 1, wherein said high-temperature, high-pressure treatment is hot isostatic pressing.

5. The method of producing a uniform silica glass block according to claim 1, wherein said high-temperature, high-pressure treatment is hot pressing.

6. The method of producing a uniform silica glass block according to claim 4, wherein said calcined product is sealed in a gas-tight container and then subjected to a high-temperature, high-pressure treatment by a hot isostatic press, whereby a pressure medium gas is prevented from being dissolved and diffused in the resulting silica glass.

7. The method of producing a uniform silica glass block according to claim 5, wherein said calcined product is sealed in a gas-tight container and then subjected to a high-temperature, high-pressure treatment by a hot press, whereby an atmosphere gas is prevented from being dissolved and diffused in the resulting silica glass.

8. The method of producing a uniform silica glass block according to claim 7, wherein said hot pressing is conducted in vacuum of 1 Pa or less or in an inert gas atmosphere.

9. The method of producing a uniform silica glass block according to claim 6, wherein said container is made of silica glass or a high-melting point metal.

10. The method of producing a uniform silica glass block according to claim 7, wherein said container is made of silica glass or a high-melting point metal.

11. The method of producing a uniform silica glass block according to claim 9 or 10, wherein said gas-tight container is made of silica glass, having a thickness of 0.3–3 mm.

12. The method of producing a uniform silica glass block according to claim 9 or 10, wherein said gas-tight container is made of a high-melting point metal, having a thickness of 0.05–5 mm.

13. The method of producing a uniform silica glass block according to claim 7, wherein said gas-tight container containing said calcined product is embedded in silica powder or carbon powder and then subjected to a high-temperature, high-pressure treatment.

14. The method of producing a uniform silica glass block according to claim 6, wherein said calcined product is charged into the container at a density of 1.1 g/cm$^3$ or more.

15. The method of producing a uniform silica glass block according to claim 7, wherein said calcined product is charged into the gas-tight container at a density of 1.1 g/cm$^3$ or more.

16. The method of producing a uniform silica glass block according to claim 1, wherein said calcined product is charged into a container of a desired shape and then subjected to a high-temperature, high-pressure treatment, thereby efficiently providing the resulting silica glass block with the desired shape.

17. The method of producing a uniform silica glass block according to claim 1, wherein the variation of refractive index ($\Delta n$) from place to place in the resulting silica glass block is $2 \times 10^{-6}$ or less, and said silica glass block does not contain any voids of 10 $\mu$m or larger.

18. The method of producing a uniform silica glass block according to claim 1, wherein the resulting silica glass block has the variation of refractive index ($\Delta n$) of $2 \times 10^{-6}$ or less and no voids, and further has transmittance substantially on the same level as that of optical synthetic silica glass in the range from ultraviolet to infrared.

* * * * *